(12) United States Patent
Pettersson et al.

(10) Patent No.: US 9,434,375 B2
(45) Date of Patent: Sep. 6, 2016

(54) DRIVE SYSTEM AND METHOD OF DRIVING A VEHICLE

(71) Applicant: Scania CV AB, Södertälje (SE)

(72) Inventors: Niklas Pettersson, Stockholm (SE); Mikael Bergquist, Hägersten (SE); Anders Kjell, Stockholm (SE); Mathias Björkman, Tullinge (SE); Johan Lindström, Nyköping (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/410,596

(22) PCT Filed: Jun. 26, 2013

(86) PCT No.: PCT/SE2013/050786
§ 371 (c)(1),
(2) Date: Dec. 23, 2014

(87) PCT Pub. No.: WO2014/003667
PCT Pub. Date: Jan. 3, 2014

(65) Prior Publication Data
US 2015/0203097 A1    Jul. 23, 2015

(30) Foreign Application Priority Data

Jun. 27, 2012 (SE) ...................................... 1200390

(51) Int. Cl.
*B60W 10/08* (2006.01)
*B60W 20/00* (2016.01)
(Continued)

(52) U.S. Cl.
CPC ............ *B60W 20/106* (2013.01); *B60K 6/365* (2013.01); *B60K 6/48* (2013.01); *B60W 10/02* (2013.01);
(Continued)

(58) Field of Classification Search
None
See application file for complete search history.

(56) References Cited

U.S. PATENT DOCUMENTS

| 6,054,776 A | 4/2000 | Sumi ............................. 290/17 |
| 6,428,438 B1 * | 8/2002 | Bowen ..................... B60K 6/36 |
| | | 475/5 |

(Continued)

FOREIGN PATENT DOCUMENTS

DE    10 2006 003 723 A1    8/2007

OTHER PUBLICATIONS

International Search Report mailed Oct. 18, 2013 in corresponding PCT International Application No. PCT/SE2013/050786.

*Primary Examiner* — Dirk Wright
(74) *Attorney, Agent, or Firm* — Ostrolenk Faber LLP

(57) ABSTRACT

A drive system and a method of driving a vehicle in which the drive system includes a combustion engine, a brake device for braking the vehicle, an electric machine, an energy storage connected to the electric machine, at least one electric assembly operated by electric energy and a planetary gear including a sun wheel, a ring wheel and a planet wheel holder. A control unit is adapted to, when the vehicle is in motion, a driving moment is demanded and a coupling member is in a first position, based on a comparison between the demanded driving moment and a necessary moment required for operation of the electric assembly, control at least one of the combustion engine, the brake device and the electric machine such that desired electric energy is provided for operation of the electric assembly.

17 Claims, 3 Drawing Sheets

Figure 1:
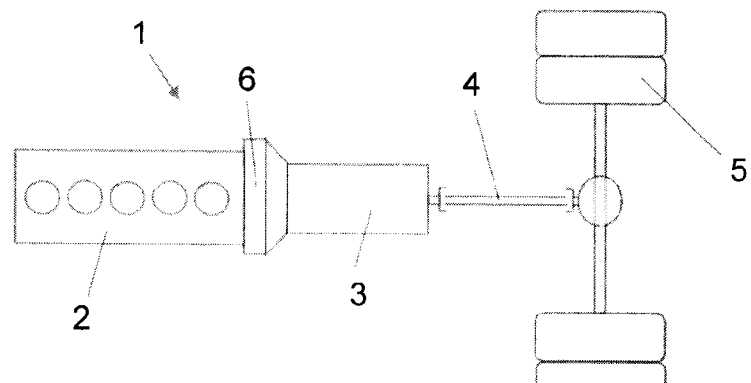

(51) Int. Cl.
*B60K 6/365* (2007.10)
*B60K 6/48* (2007.10)
*B60W 10/02* (2006.01)
*B60W 10/06* (2006.01)
*B60W 30/188* (2012.01)
*B60W 10/18* (2012.01)
*B60W 30/18* (2012.01)
*B60W 10/184* (2012.01)

(52) U.S. Cl.
CPC .............. *B60W 10/06* (2013.01); *B60W 10/08* (2013.01); *B60W 10/18* (2013.01); *B60W 20/13* (2016.01); *B60W 30/18063* (2013.01); *B60W 30/1886* (2013.01); *B60W 10/184* (2013.01); *B60W 2510/244* (2013.01); *B60W 2710/105* (2013.01); *B60Y 2400/421* (2013.01); *Y02T 10/6221* (2013.01); *Y10S 903/93* (2013.01); *Y10T 477/24* (2015.01)

(56) References Cited

U.S. PATENT DOCUMENTS

| | | | | |
|---|---|---|---|---|
| 6,655,485 | B1* | 12/2003 | Ito | B60W 20/40 180/65.6 |
| 7,416,501 | B2* | 8/2008 | Holmes | B60K 6/365 192/3.52 |
| 8,235,853 | B2* | 8/2012 | Lutoslawski | B60K 6/365 475/5 |
| 8,360,913 | B2* | 1/2013 | Janssen | B60K 6/365 475/5 |
| 8,702,546 | B2* | 4/2014 | Kaltenbach | B60K 6/365 475/150 |
| 8,840,502 | B2* | 9/2014 | Bergquist | B60K 6/387 475/5 |
| 9,188,201 | B2* | 11/2015 | Liu | F16H 3/72 |
| 2003/0205930 | A1 | 11/2003 | Smart | 303/20 |
| 2008/0109139 | A1* | 5/2008 | Muta | B60W 10/115 701/48 |
| 2010/0323844 | A1 | 12/2010 | Okubo et al. | 477/3 |
| 2015/0197146 | A1* | 7/2015 | Vagstedt | B60K 6/48 475/5 |

* cited by examiner

DRIVE SYSTEM AND METHOD OF DRIVING A VEHICLE

CROSS-REFERENCE TO RELATED APPLICATIONS

The present application is a 35 U.S.C. §§371 National Phase conversion of PCT/SE2013/050786, filed Jun. 26, 2013, which claims priority of Swedish Patent Application No. 1200390-1, filed Jun. 27, 2012, the contents of which are incorporated by reference herein. The PCT International Application was published in the English language.

BACKGROUND OF THE INVENTION AND PRIOR ART

The present invention concerns a drive system and a method of driving a vehicle.

To use a conventional clutch mechanism which disconnects the input shaft of the gear box from the combustion engine during gear changes in the gear box involves disadvantages. When a stationary vehicle starts, the discs of the clutch mechanism slide against each other, thereby heating the discs. This heating results in increased fuel consumption and wear of the clutch discs. A conventional clutch mechanism is also relatively heavy and expensive. It also occupies a relatively large space in the vehicle. Hydraulic moment converters also result in losses.

Hybrid vehicles may be driven by a primary motor, which may be a combustion engine, and a secondary motor, which may be an electric machine. The electric machine is equipped with at least one energy storage for storing electric energy and control equipment for controlling the flow of electric energy between the energy storage and the electric machine. The electric machine may alternately work as a motor and a generator depending on the operation state of the vehicle. When the vehicle is braked, the electric machine generates electric energy which is stored in the energy storage. The stored electric energy is used later, for example, for driving the vehicle and operating different auxiliary systems in the vehicle.

Swedish patent application SE 1051384-4, which has not been made public, shows a hybrid drive system with a planetary gear including three components, namely, a sun wheel, a planet wheel holder and a ring wheel. One of the three components of the planetary gear is connected to an output shaft of the combustion engine, a second component of the planetary gear is connected to an input shaft of the gear box and a third component of the planetary gear is connected to a rotor of an electric machine. The electric machine is connected to an energy storage such that it alternately works as a motor and a generator. The rotation speed of electric machines may be controlled in a stepless manner. By controlling the rotation speed of the electric machine, the input shaft of the gear box may be rotated at a desired rotation speed. With a hybrid system according to SE 1051384-4 no clutch mechanism needs to be used in the drive line of the vehicle.

In conventional hybrid vehicles with a clutch, the combustion engine cannot be used for charging the energy storage when the speed is so low that the vehicle can not be driven with the clutch in a closed position. When such a hybrid vehicle in the form of, for example, a bus, is driven at a very low speed during, for example, queuing, there is a risk that it will be driven with an engaged gear and the clutch in an open position. If at the same time, the energy storage is loaded by other electrically operated assemblies in the vehicle, such as, for example, a compressor of AC-equipment, the energy storage may be discharged quite quickly. In this case, the vehicle is stopped, the engaged gear must be disengaged, and the clutch must be closed in order to charge the energy storage. Alternatively, the vehicle must begin to slip heavily on the clutch to charge the energy storage.

SUMMARY OF THE INVENTION

The object of the present invention is to provide a drive system for a vehicle as mentioned above, where the energy storage has the capacity to supply electric energy for the operation of at least one electrically operated assembly in the vehicle when the vehicle is driven at a low speed.

This object is achieved with a drive system including the features disclosed herein. When the vehicle is in motion at a low speed and the driver (and/or a control system in the vehicle) demands a driving moment of the vehicle, the combustion engine is driven with an actual rotation speed, the planetary gear is in an open position and a gear is engaged in the gear box.

According to an embodiment of the present invention, the control unit receives information concerning the charge level of the energy storage and, when the charge level of the energy storage is lower than a limit level, controls the brake device and the electric machine such that it generates at least as much electric energy as said assembly consumes. If the energy storage has a high charge level, it is not always necessary for the electric machine to generate as much electric energy as said assembly consumes. In this case, the electric machine may, at least during a period of time, generate less electric energy than said assembly consumes. Alternatively, the charge level of the energy storage may be allowed to sink to the lowest acceptable level.

According to an embodiment of the present invention, the control unit is adapted to, when the vehicle is in motion, the coupling member is in the first position and a driving moment is demanded by the vehicle, control the brake device such that it supplies a braking moment of a magnitude such that the vehicle remains in motion.

The control unit is preferably adapted to, when the energy storage has a higher charge level than said limit level, release the brake device completely, or in appropriate cases, control the brake device such that thereafter it does not supply a braking moment, and control the electric machine such that it delivers a moment of a magnitude to drive the vehicle with the demanded moment. In this case, the electric machine is controlled such that it provides a moment with a transmission ratio related to the demanded moment of the vehicle. The vehicle thereby keeps on rolling with the driving moment demanded by the driver.

According to an embodiment of the present invention, the control unit is adapted to, when the energy storage has a lower charge level than said limit level, release the brake device completely, or in appropriate cases, control the brake device such that it does not supply a braking moment, control the combustion engine such that it has a sufficiently high rotation speed for electric energy to be generated for the energy storage and to control the electric machine such that it generates at least as much electric energy as is consumed by said assembly. In this case, the control unit may activate a motor control function which increases the rotation speed of the combustion engine concurrently with an increased speed of the vehicle. The rotor of the electric machine may thereby be made to rotate in an opposite direction in relation to the direction of rotation of the combustion engine also when the speed of the vehicle increases. Electric energy may thereby be generated during a desired time period. The rotation speed of the combustion engine is controlled such that the electric machine generates as least as much energy in the energy storage as is consumed during operation of said assembly. The operation of said assembly is thereby guaranteed at occasions when the energy storage has a low charge level.

According to an alternative embodiment of the present invention, the control unit is adapted to, when the energy storage has a lower charge level than said limit level, control the combustion engine such that it is driven at idle running rotation speed, or a prevailing rotary speed, control the brake device such that it applies a braking moment which results in the vehicle being driven with the demanded moment and to control the electric machine such that it generates at least as much electric energy to be stored in the energy storage as is consumed by said assembly. In this case, the brake device is used for supplying a braking moment such that the vehicle is driven with the demanded driving moment at the same time as electric energy is generated in at least the same amount as is consumed by said assembly. The operation of said assembly is thereby guaranteed at occasions when the energy storage has a low charge level.

According to an embodiment of the invention, the control unit is adapted to control the coupling member such that it is moved to the second position as soon as the vehicle reaches a speed at which it is possible to lock the output shaft of the combustion engine to the input shaft of the gear box. In particular, when the energy storage has a low charge level, it is suitable to lock the output shaft of the combustion engine to the input shaft of the gear box as quickly as possible. The combustion engine is then responsible for driving the vehicle, the operating assembly and charging the energy storage.

According to an embodiment of the invention, the brake device is an existing brake in the vehicle. Preferably, the brake device is an existing brake which acts on the drive line or wheels of the vehicle. However, the brake device preferably has the capacity to supply a variable braking moment. Alternatively, the brake device may be a separate brake which is used only for supplying a variable braking moment to generate electric energy in the energy storage.

According to an embodiment of the invention, the assembly is a compressor in AC-equipment. Such equipment may, during operation, consume a relatively high amount of electric energy from the energy storage and/or electric energy generated by the electric machine (during occasions when it works as a generator). The assembly may however, be one or more arbitrary assemblies which are operated by electric energy from the energy storage.

According to another preferred embodiment of the invention, the output shaft of the combustion engine is connected to the sun wheel of the planetary gear, the input shaft of the gear box is connected to the planet wheel holder of the planetary gear and the rotor of the electric machine is connected to the ring wheel of the planetary gear. With such a design, the included components have a compact construction. The sun wheel and the planet wheel holder may be connected to the output shaft of the combustion engine and the input shaft of the gear box, respectively, with the help of spline joints or the like. It is thereby guaranteed that the sun wheel rotates at the same rotation speed as the output shaft of the combustion engine and that the planet wheel holder rotates at the same rotation speed as the input shaft of the gear box. The rotor of the electric machine may be fixedly arranged on an external peripheral surface of the ring wheel. The internal peripheral surface of the ring wheel is normally provided with cogs. The external peripheral surface of the ring wheel is normally smooth and this is very well suited for carrying the rotor of the electric machine. The ring wheel and the rotor of the electric machine thereby form a rotatable unit. Alternatively, the rotor of the electric machine may be connected to the ring wheel via a transmission. It is, however, possible to connect the output shaft of the combustion engine, the input shaft of the gear box and the rotor of the electric machine with any of the other components of the planetary gear.

The initially mentioned object is achieved also by the method disclosed herein.

SHORT DESCRIPTION OF THE DRAWINGS

Figure 2:
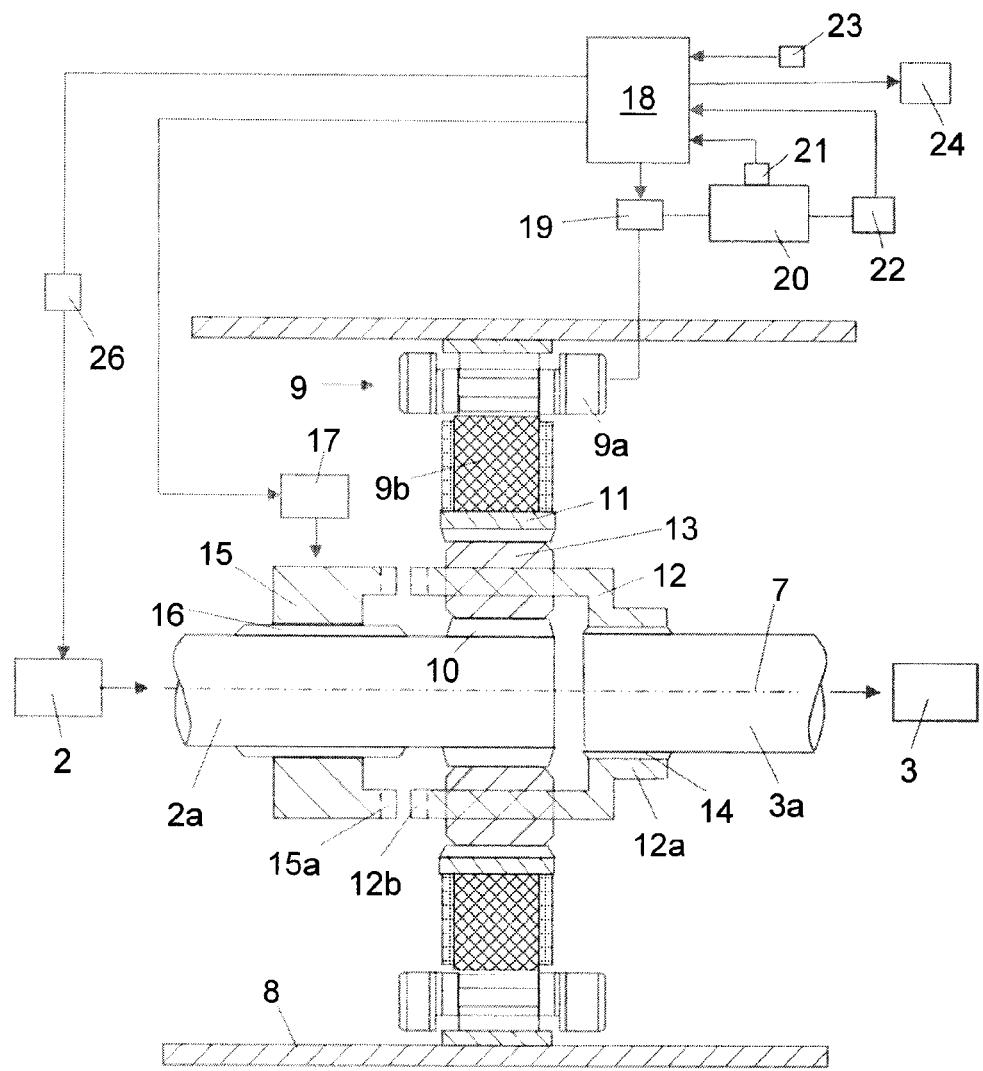
Figure 3:
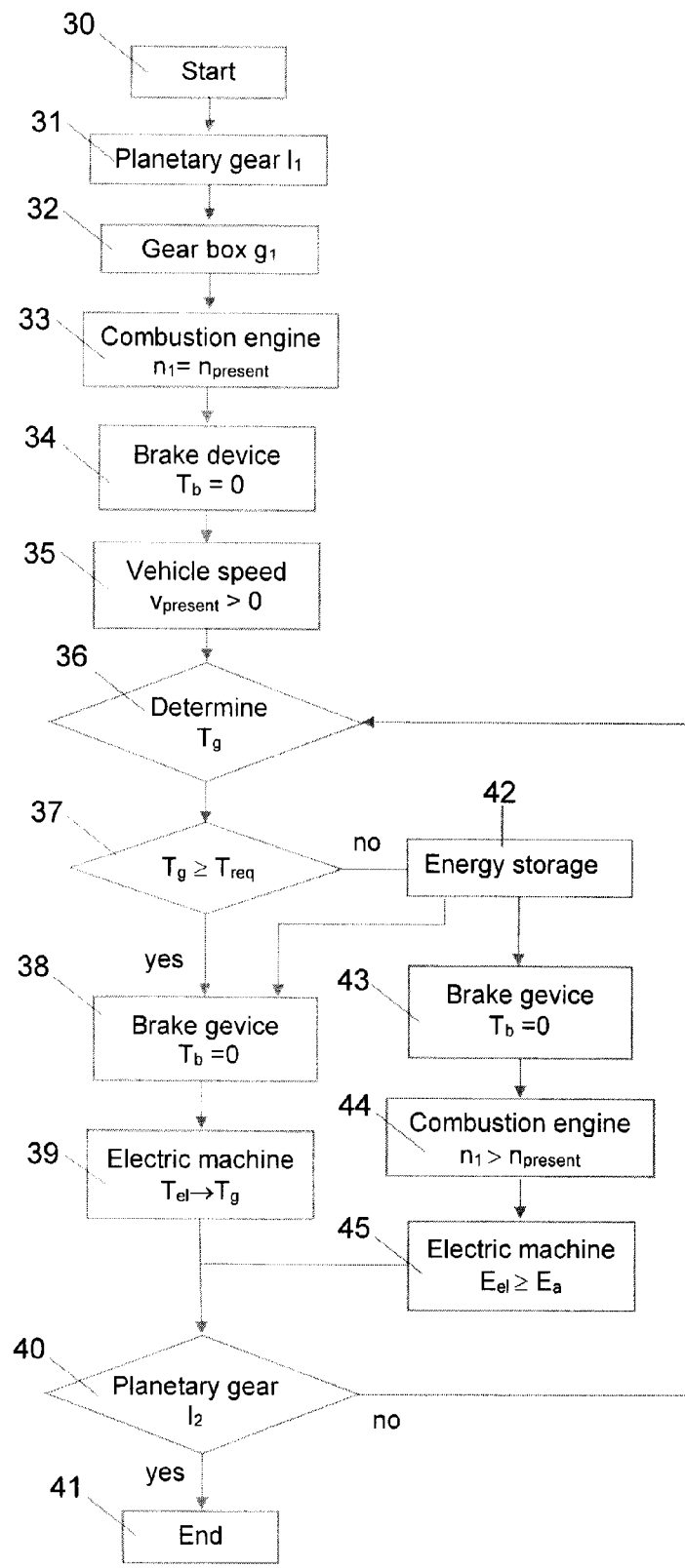
Figure 4:
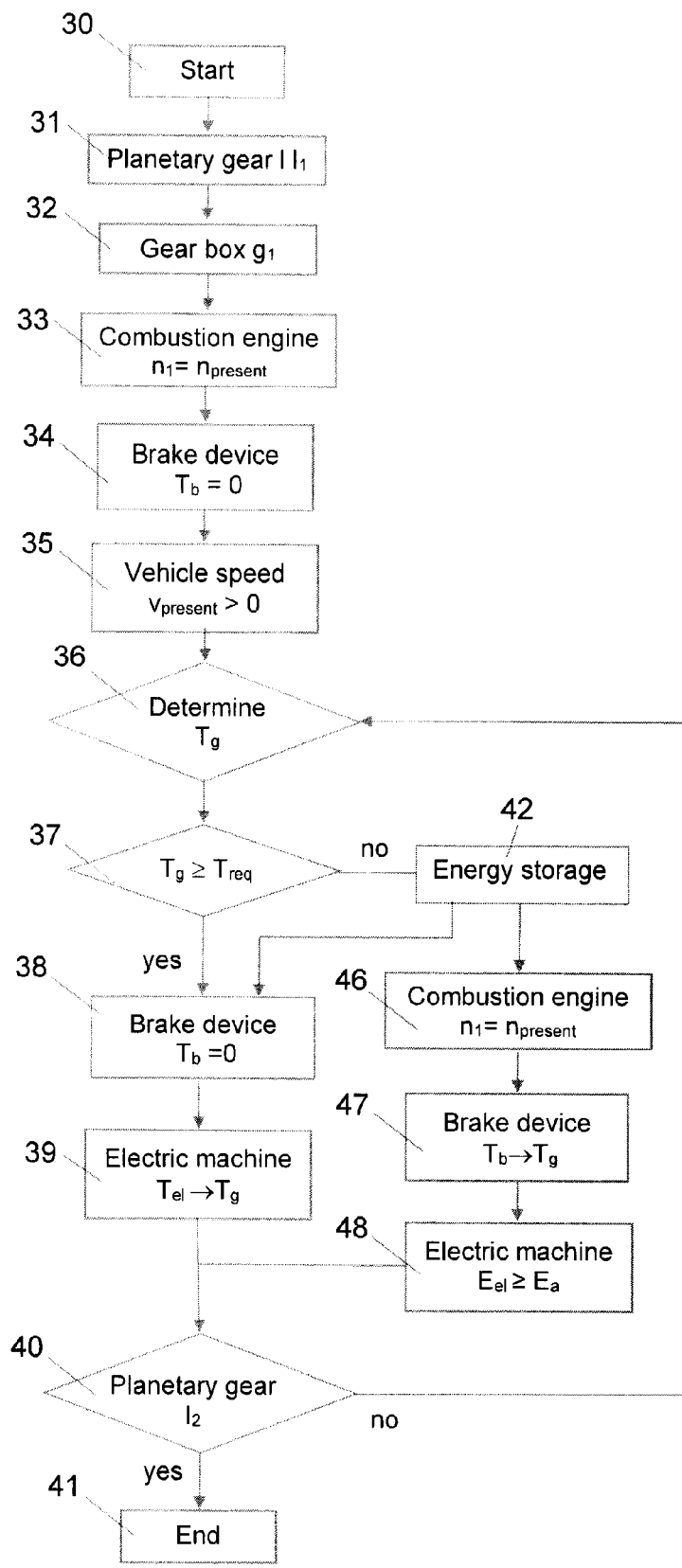

In the following preferred embodiments of the invention are described, as examples, with reference to the annexed drawings, on which:

FIG. 1 shows a drive line of a vehicle with a drive system according to the present invention, FIG. 2 shows the drive system in more detail, FIG. 3 shows a flow chart which describes a first embodiment of a method according to the present invention and FIG. 4 shows a flow chart which describes a second embodiment of a method according to the present invention.

DETAILED DESCRIPTION OF PREFERRED EMBODIMENTS OF THE INVENTION

FIG. 1 shows a drive line for a heavy vehicle 1. The drive line includes a combustion engine 2, a gear box 3, a number of drive shafts 4 and drive wheels 5. Between the combustion engine 2 and the gear box 3, the drive line includes an intermediate part 6. FIG. 2 shows the components in the intermediate part 6 in more detail. The combustion engine 2 is provided with an output shaft 2a and the gear box 3 with an input shaft 3a in the intermediate part 6. The output shaft 2a of the combustion engine is coaxially arranged in relation to the input shaft 3a of the gear box. The output shaft 2a of the combustion engine and the input shaft 3a of the gear box are rotatably arranged around a common axis of rotation 7. The intermediate part 6 includes a housing 8 which encloses an electric machine 9 and a planetary gear. The electric machine 9 includes in a customary manner a stator 9a and a rotor 9b. The stator 9a includes a stator core which is attached in a suitable manner on the inside of the housing 8. The stator core includes the windings of the stator. The electric machine 9 is adapted to, during certain operation states, use stored electric energy for supplying drive power to the input shaft 3a of the gear box and, during other operation states use the kinetic energy of the input shaft 3 of the gear box for extracting and storing electric energy.

The planetary gear is arranged substantially radially inside of the stator 9a and rotor 9b of the electric machine. The planetary gear comprises in a customary manner a sun wheel 10, a ring wheel 11 and a planet wheel holder 12. The planet wheel holder 12 carries a number of cog wheels 13 which are rotatably arranged in a radial space between the cogs of the sun wheel 10 and the ring wheel 11. The sun wheel 10 is attached on a peripheral surface of the output shaft 2a of the combustion engine. The sun wheel 10 and the output shaft 2a of the combustion engine rotate as a unit at a first rotation speed $n_1$. The planet wheel holder 12 comprises an attachment portion 12a which is attached on a peripheral surface of the input shaft 3a of the gear box with the help of a spline joint 14. With the help of this joint, the planet wheel holder 12 and the input shaft 3a of the gear box rotate as a unit at a second rotation speed $n_2$. The ring wheel 11 comprises an external peripheral surface on which the rotor 9b is fixedly mounted. The rotor 9b and the ring wheel 11 constitute a rotatable unit which rotates at a third rotation speed $n_3$.

Since the intermediate part 6 between the combustion engine 2 and the gear box 3 in a vehicle is limited, it is required that the electric machine 9 and the planetary gear constitute a compact unit. The components 10-12 of the planetary gear are here arranged substantially radially inside of the stator 9a of the electric machine. The rotor 9b of the electric machine, the ring wheel 11 of the planetary gear, the output shaft 2a of the combustion engine and the input shaft 3a of the gear box are here rotatably arranged around a common axis of rotation 7. With such a design, the electric machine 9 and the planetary gear occupy a relatively small space.

The vehicle comprises a locking mechanism which is movable between an open position in which the three components 10-12 of the planetary gear are allowed to rotate with different rotation speeds and a locked position in which it locks together two of the components 10, 12 of the planetary gear such that the three components 10-12 of the planetary gear rotate with the same rotation speed. In this embodiment, the locking mechanism comprises a displaceable coupling member 15. The coupling member 15 is attached on the output shaft 2a of the combustion engine with the help of a spline joint 16. The coupling member 15 is, in this case arranged and secured against turning on the output shaft 2a of the combustion engine and displaceable in an axial direction on the output shaft 2a. The coupling member 15 comprises a coupling portion 15a which is connectable to a coupling portion 12b of the planet wheel holder 12. The locking mechanism comprises a schematically shown displacement member 17 adapted to displace the coupling member 15 between the first free position $I_1$ when the coupling portions 15a, 12b are not in engagement with each other, and the second locked position $I_2$ when the coupling portions 15a, 12b are in engagement with each other. In the first open position, the output shaft 2a of the combustion engine and the input shaft 3a of the gear box may rotate with different rotation speeds. When the coupling portions 15a, 12b are in engagement with each other, the output shaft 2a of the combustion engine and the input shaft 3a of the gear box will rotate with the same rotation speed.

An electric control unit 18 controls the displacement member 17. The control unit 18 decides when the electric machine 9 is to work as a motor and at which operation occasions it is to work as a generator. In order to decide this, the control unit 18 receives actual information from suitable operation parameters. The control unit 18 may be a computer with a suitable software for this purpose. One or more separate control units may be used. The control unit 18 also controls schematically shown control equipment 19 which controls the flow of electric energy between an energy storage 20 and the stator 9a of the electric machine. When the electric machine 9 works as a motor, stored electric energy from the energy storage 20 is supplied to the stator 9a. When the electric machine works as a generator, electric energy from the stator 9a is supplied to the energy storage 20. The energy storage 20 delivers and stores electric energy with a rated voltage on the order of 200-800 Volts.

A measurement instrument 21 senses at least a parameter which is related to the charge level q in the energy storage 20. The function of the measurement instrument 21 may be integrated in the electric control unit 18 or in any other suitable control unit. The charge level q in the energy storage 20 may be determined in any suitable manner. The energy storage 20 is also connected to one or more electrically operated assemblies 22 in the vehicle. The electrically operated assemblies include a compressor in AC-equipment.

The control unit 18 may be adapted to receive information regarding the charge level q in the energy storage 20.

During operation of the vehicle 1, a driver may demand a driving moment $T_g$ of the vehicle 1 with a schematically shown accelerator pedal 23. When the accelerator pedal 23 is not depressed, it may correspond to a demanded driving moment $T_g$ which is negative (a braking moment is desired). When the accelerator pedal 23 is partly (lesser than a limit value) depressed, it may correspond to a demanded driving moment $T_g$ which is negative (a braking moment is desired). As an alternative to a demanded driving moment $T_g$ demanded via the accelerator pedal 23, a control system in a vehicle (for example during use of ACC-Adaptive Cruise Control) may demand driving moment $T_g$. The vehicle 1 is equipped with at least one brake device 24 with which the drive wheels 5 of the vehicle may be braked. The vehicle 1 is equipped with a motor control function 26 with which the moment $T_1$ and rotation speed $n_1$ of the combustion engine may be controlled. The control unit 18 has, for example, the ability to activate the motor control function 26 to create a momentless state in the gear box 3 when gears are engaged and disengaged.

FIG. 3 shows a flow chart which describes a method applicable from the time that the vehicle is in motion with a speed $v_{present}$ with the planetary gear in the first position $I_1$ until the vehicle has obtained a speed at which it is possible to arrange the planetary gear in the second locked position $I_2$. The method starts at the step 30. If the planetary gear is not already in the first (open) position $I_1$, it is arranged in the first position $I_1$, at step 31. The output shaft 2a of the combustion engine and the input shaft 3a of the gear box are freely moveable in relation to each other. A gear $g_1$ is engaged in the gear box 3 at step 32. It is evident from step 33 that the combustion engine 2 is driven with the rotation speed $n_1 = n_{present}$. The brake device 24 is applied, at step 34, with a braking moment $T_b$ which is equal to zero (no braking moment). It is evident from step 35 that the vehicle has a certain speed $v_{present}$ which is larger than zero ($v_{present} > 0$).

At the step 36, the control unit 18 senses/determines the driving moment $T_g$ demanded by, for example, the driver via the accelerator pedal. At step 37, the control unit 18 determines if the demanded driving moment $T_g$ is larger than, or equal to, a necessary moment $T_{req}$, necessary for the operation of the assembly 22. If the driving moment $T_g$ is larger than the necessary moment $T_{req}$, there is an excess of effect for operating the assembly/assemblies 22.

At low vehicle speeds $v_{present}$, the ring wheel 11 and the rotor 9b of the electric machine rotate in a negative direction such that electric energy is generated and may be stored in the energy storage 20 and/or directly consumed. When the vehicle 1 (depending on a possible acceleration) reaches a speed $v_1$, the ring wheel 11 and the rotor 9b of the electric machine start to rotate in a positive direction. A supply of electric energy $E_{el}$ to the electric machine 9 is thereby required in order to increase the speed of the vehicle 1 further. When the vehicle reaches a speed $v_2$, it is possible to arrange the planetary gear in a locked position $I_2$.

The consumption of electric energy is substantial if the energy storage 20 has to supply electric energy $E_{el}$ to the electric machine 9 and at the same time supply the electrically operated assembly 22 with electric energy $E_a$. If the vehicle 1, during a longer period, is driven at a speed which is higher than $v_1$ and lower than $v_2$, the consumption of electric energy may get so large that the energy storage 20 discharges completely.

If the control unit 18, at step 37, receives information from the measurement instrument 21 that indicates that there is an excess of energy, the energy storage 20 does not risk being discharged. The brake device 24 controls the brake such that $T_b=0$ (no braking moment), at step 38, and the vehicle 1 is continuously driven in the elected driving direction. At the step 39, the electric machine 9 supplies a moment $T_{el}$ such that the vehicle 1 obtains the driving moment $T_g$ demanded, for example, by the accelerator pedal 23. The excess or the deficit of electric energy to the electric assembly 22 is taken care of by the energy storage 20. The control unit 18 investigates, at step 40, if it is possible to lock the planetary gear. If this is possible, the planetary gear is arranged in the second locked position $I_2$ and the process ends at step 41. In the locked position of the planetary gear, the combustion engine 2 may be responsible for the whole operation of the vehicle 1, the operation of the electric assembly 22 and, if required, for charging the energy storage 20.

If the control unit 18, at step 40, finds that the planetary gear cannot be arranged in the second locked position $I_2$, the method starts again at step 36 where the demanded driving moment $T_g$ is determined. At step 37, the control unit 18 determines if the demanded driving moment $T_g$ is larger than the necessary moment $T_{req}$. If $T_g$ is less than the necessary moment $T_{req}$, there is a deficit of effect for the operation of the assembly/assemblies 22. At step 42 it is determined if the energy storage 20 has the capacity to handle this deficit. This may compare information regarding the charge level q of the energy storage 20 with a determined limit level $q_0$. If the charge level q of the energy storage 20 is higher than the limit level $q_0$, the energy storage 20 is considered to have capacity to supply the effect deficit. In this case (the energy storage is considered to have capacity to supply the effect deficit), the method continues at step 38. If not (the charge level q of the energy storage 20 is less than the limit level $q_0$), the method continues, at step 43, where it appears that the brake device 24 does not supply any braking moment $T_b=0$. The vehicle 1 is thus not braked at all by the brake device 24. However, in this case, at step 44, the rotation speed $n_1$ of the combustion engine is increased to a higher level than the actual/prevailing rotation speed $n_{present}$.

Since the rotation speed $n_1$ of the combustion engine is increased, the ring wheel 11 may rotate in a negative direction and electric energy is generated and stored in the energy storage 20 during a longer time than if the combustion engine is driven with the actual/prevailing rotation speed $n_{present}$. Since the rotation speed $n_1$ of the combustion engine is increased, even if the ring wheel 11 is already rotating in a negative direction, the ring wheel 11 will rotate with an increased negative rotation speed (an increased absolute amount) if an increased effect requirement exists or will be exist. The control unit 18 controls the rotation speed $n_1$ of the combustion engine, via the motor control function 26, such that electric energy is generated at a desired amount and led to the energy storage 20 and/or the assembly 22. The control unit 18 controls, at step 45, the rotation speed $n_1$ of the combustion engine such that at least as much electric energy $E_{el}$ is generated as is consumed by the electric assembly (22) $E_a$. The electric machine 9 provides a moment $T_{el}$ which is a transmission ratio times the demanded moment $T_g$. The control unit 18 determines, at step 40, if it is possible to lock the planetary gear. If possible, the planetary gear is arranged in the second locked position $I_2$ and the method ends at the step 41. Otherwise, the method starts again at step 36.

FIG. 4 shows an alternative method for a starting process of the vehicle 1 when it is equipped with one or more electric assemblies 22 which requires electric energy $E_a$ for operation. The method in FIG. 4 corresponds to the method in FIG. 3 at least for the steps 30-37. At step 37 of FIG. 4 it is determined whether there is an excess or deficit of effect by determining if the demanded driving moment $T_g$ is larger than or equal a necessary moment $T_{req}$. If there is an excess of effect which enables the operation of the assembly 22, the method continues at step 38. When this is not the case, it is determined, at step 42, if the energy storage 20 has charge level q is such that the assembly 22 may be operated anyway. If this is the case (the charge level q of the energy storage 20 is higher than the limit level $q_0$), the method continues at the step 38. If this is not the case (the charge level q of the energy storage 20 is lower than the limit level $q_0$), the method continues at step 46. In this case, the combustion engine 2 is continuously driven with the actual/prevailing rotation speed $n_{present}$. At step 47, the brake device 24 is applied such that it brakes the vehicle 1. The control unit 18 controls the brake device 24 such that it supplies a braking moment $T_b$ such that the vehicle 1 obtains the moment $T_g$ which is demanded by, for example, the accelerator pedal. The control unit 18 controls the electric machine 9, at step 48, such that it produces at least as much electric energy $E_{el}$ as corresponds to the energy need $E_a$ of the electric assembly. The control unit 18 determines, at step 40, if it is possible to lock the planetary gear. If this is possible, the planetary gear is arranged in the second locked position $I_2$ and the starting process ends at the step 41. Otherwise the method starts again at the step 36.

In the flow chart in FIG. 3, the steps 43-45 are used, alternatively 38-39, when there is a deficit of effect for the operation of the electric assembly 22. In the flow chart in FIG. 4, the steps 46-48 are used, alternatively 38-39, when there is a deficit of effect for the operation of the electric assembly 22. It is obviously possible to use the three different measures alternately or in combination when there is a need to supply effect in order to operate the electric assembly 22.

The invention is in no way limited to the embodiment described on the drawings but can be varied freely within the scope of the claims. For example, a transmission with a gear ratio can be arranged between the rotor 9 and the ring wheel 11. The rotor 9 and the ring wheel 11 need thus not rotate with the same rotation speed.

The invention claimed is:

1. A drive system for a vehicle comprises:
   a combustion engine including an output shaft;
   a gear box including an input shaft;
   a brake device with which the vehicle is braked;
   an electric machine including a stator and a rotor;
   an energy storage connected to the electric machine;
   at least one assembly operated by electric energy from the energy storage;
   a planetary gear including a sun wheel, a ring wheel and a planet wheel holder;
   a coupling member movably arranged between a first position in which it allows rotation of the sun wheel, the ring wheel and the planet wheel holder in the planetary gear with different rotation speeds and in a second position in which it locks the sun wheel, the ring wheel and the planet wheel holder in relation to each other such that they rotate with the same rotation speed;

wherein the output shaft of the combustion engine is coupled to the sun wheel of the planetary gear to directly connect the engine to the planetary gear such that rotation of the output shaft causes rotation of the sun wheel, wherein the input shaft of the gear box is connected to the planet wheel holder of the planetary gear such that rotation of the input shaft causes rotation of the planet wheel holder, and the rotor of the electric machine is connected to the ring wheel of the planetary gear such that rotation of the rotor causes rotation of the ring wheel; and a control unit controlling, when the vehicle is in motion, a driving moment is demanded, and the coupling member is in the first position, based on a comparison between the demanded driving moment and a necessary moment required for operation of the at least one assembly, at least one of the combustion engine, the brake device, and the electric machine to provide desired electric energy for operation of the at least one assembly.

2. The drive system according to claim 1, wherein the control unit receives information concerning a charge level of the energy storage.

3. The drive system according to claim 2, wherein the control unit controls at least one of the combustion engine, the brake device , and the electric machine based on a comparison between the charge level of the energy storage and a limit level for the charge level of the energy storage.

4. The drive system according to claim 3, wherein the control unit, when the energy storage has a lower charge level than said limit level, controls the combustion engine to provide a necessary high rotation speed for generating electric energy and the electric machine such that it generates at least as much electric energy as the at least one assembly consumes.

5. The drive system according to claim 3, wherein the control unit, when the energy storage has a lower charge level than said limit level, controls the brake device to apply a braking moment such that the vehicle is driven with the demanded moment and controls the electric machine such that it generates at least as much electric energy as the at least one assembly consumes.

6. The drive system according to claim 1, wherein the control unit controls the coupling member such that it is moved to the second position as soon as the vehicle reaches a speed at which it is possible to lock the output shaft of the combustion engine to the input shaft of the gear box.

7. The drive system according to claim 1, wherein the brake device is a wheel brake in the vehicle.

8. The drive system according to claim 1, wherein the assembly is a compressor in AC-equipment.

9. The drive system according to claim 1, wherein the output shaft of the combustion engine is connected to the sun wheel of the planetary gear, the input shaft of the gear box is connected to the planet wheel holder of the planetary gear and that the rotor of the electric machine is connected to the ring wheel of the planetary gear.

10. A method of driving a vehicle, wherein the vehicle comprises:
a combustion engine including an output shaft;
a gear box including an input shaft;
a brake device with which the vehicle is braked;
an electric machine including a stator and a rotor;
an energy storage connected to the electric machine;
at least one assembly which is operated by electric energy from the energy storage;

a planetary gear which comprises a sun wheel, a ring wheel and, a planet wheel holder; and a coupling member which is movably arranged between a first position in which it allows rotation of the sun wheel, the ring wheel and the planet wheel holder in the planetary gear at different rotation speeds and in a second position in which it locks the sun wheel, the ring wheel and the plant wheel holder in relation to each other such that they rotate with the same rotation speed; and wherein the output shaft of the combustion engine is coupled to the sun wheel of the planetary gear to directly connect the engine to the planetary gear such that rotation of the output shaft causes rotation of the sun wheel, the input shaft of the gear box is connected to the plant wheel holder of the planetary gear such that rotation of the input shaft causes rotation of the planet wheel holder, and the rotor of the electric machine is connected to the ring wheel of the planetary gear such that rotation of the rotor causes rotation of the ring wheel, the method comprising:

controlling at least one of the combustion engine, the brake device, and the electric machine such that desired electric energy for operation of the at least one assembly is provided when the vehicle is in motion, a driving moment is demanded, and the coupling member is in the first position, based on a comparison between the demanded driving moment and a necessary moment required for operation of the at least one assembly.

11. The method according to claim 10, further comprising receiving at the control unit, information concerning a charge level of the energy storage.

12. The method according to claim 11, wherein the step of controlling at least one of the combustion engine, the brake device, and the electric machine is also based on a comparison between the charge level of the energy storage and a limit level for the charge level of the energy storage.

13. The drive system according to claim 12, further comprising:
controlling the combustion engine to provide a necessary high rotation speed for generating electric energy and controlling the electric machine such that it generates at least as much electric energy as the at least one assembly consumes when the energy storage ha a lower charge level than the limit level.

14. The method according to claim 12, further comprising controlling the brake device such that it applies a braking moment such that the vehicle is driven with the demanded moment and controlling the electric machine such that it generates at least as much electric energy as the at least one assembly consumes.

15. The method according to claim 10, further comprising controlling the coupling member such that it is moved to the second position as soon as the vehicle obtains a speed at which it is possible to lock the output shaft of the combustion engine to the input shaft of the gear box.

16. A computer program product including a non-transitory data storage medium and a computer program comprising computer program code readable by a computer stored on the medium, the code enabling a computer to implement a method according to claim 10 when the computer program code is executed in the computer.

17. A vehicle comprising a drive system according to claim 1.

* * * * *